May 30, 1933.          C. J. ERNST          1,911,311
TELESCOPIC ELBOW
Filed Oct. 11, 1930
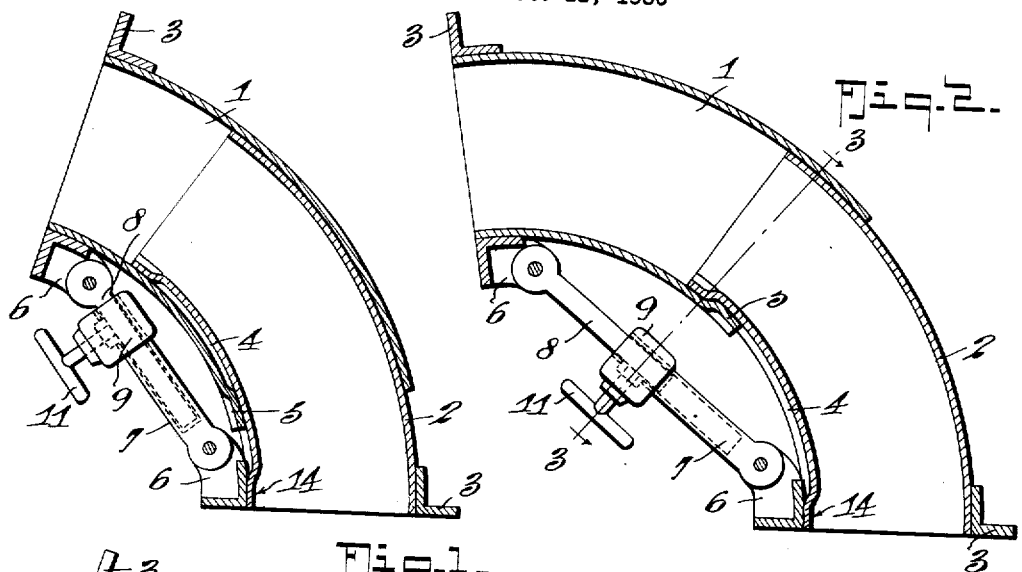
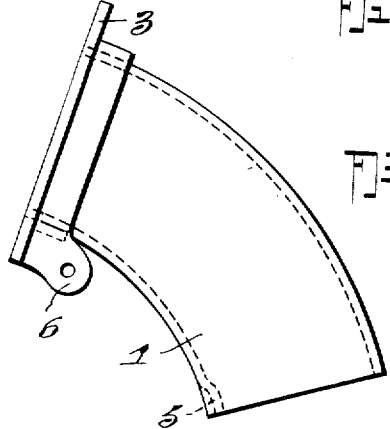
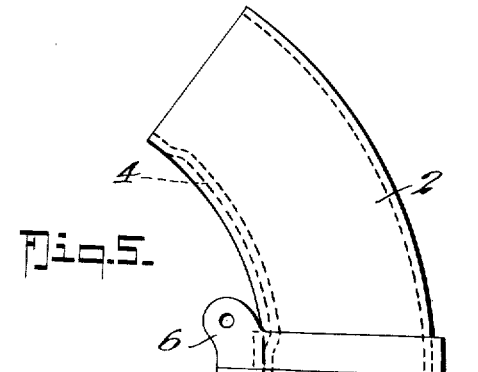
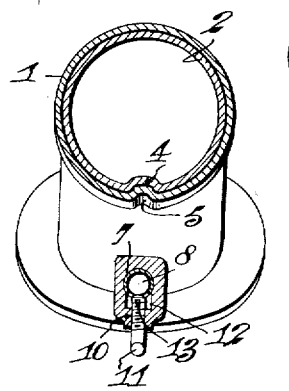
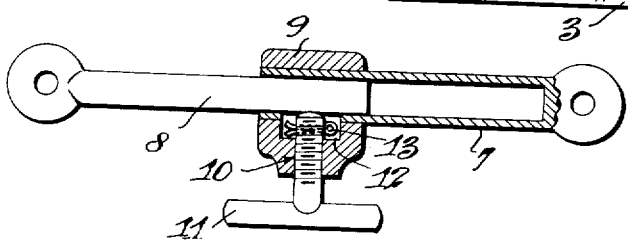
INVENTOR
*Clemens Joseph Ernst.*
BY S. George Tate
ATTORNEY Patented May 30, 1933

1,911,311

UNITED STATES PATENT OFFICE

CLEMENS JOSEPH ERNST, OF MINSTER, OHIO

TELESCOPIC ELBOW

Application filed October 11, 1930. Serial No. 488,107.

The invention primarily has for its object to provide a novel elbow construction for use in pipe line work or the like which is composed of a plurality of sections telescopic one within another to enable varying the relative positions of the elbow ends and which are so interconnected as to prevent over-extension of the joint and to readily permit the desired telescopic adjustments without danger of twist-locking or jamming of the sections.

The invention further resides in the provision of novel means for mechanically securing the telescopic adjustments of the elbow sections.

With these and other objects in view which will more fully appear, the nature of the invention will be more clearly understood by following the description, the appended claims, and the several views illustrated in the accompanying drawing.

In the drawing:—

Figure 1 is a central longitudinal section illustrating the elbow sections partially telescoped, Figure 2 is a view similar to Figure 1 with the elbow sections fully extended, Figure 3 is a cross section taken on the line 3—3 on Figure 2, Figures 4 and 5 are detail side elevations of the respective elbow sections, and Figure 6 is an enlarged detail longitudinal section of the elbow section moving means.

Like reference numerals designate corresponding parts throughout the several figures of the drawing.

My improved elbow is preferably constructed of two arcuate tubular sections 1 and 2, the latter being telescopically slidable in the former. The free or discharge end of each section may be equipped with a reinforcing ring or flange 3, said flanges being secured upon the section ends in any approved manner. The arcs of the axes of the sections 1 and 2 are struck from a common center so that the sections will slide one within the other freely and without danger of wedging.

The section 2 is provided with a longitudinal groove 4 preferably indented in the inner or small radius wall thereof and the section 1 is provided with a tongue 5 indented in the telescoping end thereof in position to enter and slide in the groove 4 of the section 2. This tongue and groove equipment of the sections serves to prevent separation of the sections due to over-extension, as the end of the groove 4 cooperates with the tongue in forming a stop preventing overextension, and also prevents twisting of one section relatively to the other such as would cause twist-locking and jamming of the sections. By forming the tongue and groove devices in the nature of smooth indentations, the interior of the elbow is kept free of obstructions which might tend to collect foreign matter or prevent free passage of material through the elbow.

Each reinforcing flange 3 carries a bracket providing apertured ears 6 and to one set of such bracket ears a sleeve 7 is pivotally connected as illustrated in Figures 1 and 2 of the drawing. A rod member 8 is telescopically slidable in the sleeve 7 and has its extended end pivotally connected to the bracket ears of the other reinforcing flange 3. Thus as the sections 1 and 2 are telescoped inwardly to a more compacted condition or outwardly to a more extended condition, the sleeve and rod members 7 and 8 will likewise be moved relatively to each other.

At its free end the sleeve 7 carries a lateral boss 9 which is provided with a threaded aperture communicating with the interior of the sleeve and adapted to receive a clamp screw 10. It will be understood that the clamp screw is loosened when an adjustment of the elbow is made and is again tightened after the adjustment has been effected to clamp against the rod member 8 and thus secure the adjustment of the elbow. For this purpose the screw is provided with a turning handle 11.

After the elbow sections have been assembled the slot 4 of the section 2 is preferably forced to closed condition, that is, in contact with the wall of the flange 3 as indicated at 14 to avoid the possibility of leakage at this point.

It will also be observed that the major portions of the ears 6 lie within the peripheral confines of the carrying flanges 3 so as not to form obstructions such as would hinder coupling of the elbow sections with other pipe sections where joints calling for partial insertion of the flanges 3 are employed.

The boss 9 is provided with an enlarged recess 12 into which the clamping end of the screw is projected to engage the rod member 8 as above described. A pin 13 is projected through this extended end of the screw within the enlarged recess and serves to permit retraction of the screw sufficient to release the clamping engagement with the rod member 8 but serves to prevent retraction or removal of the screw so as to avoid the possibility of loss.

It is of course to be understood that the details of structure and arrangements of parts may be variously changed and modified without departing from the spirit and scope of my invention.

I claim:—

1. A pipe line elbow comprising a plurality of telescopic sections, said sections having flange rings secured at their remote extremities, bracket ears projecting from each flange ring at the inner side of the elbow and toward the remaining flange ring, and means pivotally connected to and extending between the ears to secure the sections at adjusted positions, said ears having their major portions lying within the peripheral confines of the flanges for the purpose specified.

2. A pipe line elbow comprising a plurality of telescopic sheet metal sections, said sections having flange rings secured at their remote extremities, bracket ears projecting from each flange ring toward the remaining flange ring, and means connected to and between the ears to secure the sections at adjusted positions, one of said sections having a tongue pressed in the telescoped end thereof and the other of said sections having a groove pressed therein and terminating short of the ends thereof and adapted to cooperate with the tongue in limiting relative movement of the sections.

3. A pipe line elbow including inner and outer telescopic arcuate sheet metal sections having the arcs of their axes struck from a common center, said inner section having pressed in the outer surface thereof a grooveway terminating short of the telescoped end of said inner section, and said outer section having a tongue pressed into and movable in the grooveway of the inner section for the purpose described.

In testimony whereof I affix my signature.

CLEMENS JOSEPH ERNST.